US008450897B2

(12) United States Patent
Yoneyama (10) Patent No.: US 8,450,897 B2
(45) Date of Patent: May 28, 2013

(54) ROTOR FOR MOTOR AND MOTOR

(75) Inventor: Hidekazu Yoneyama, Nagano (JP)

(73) Assignee: Nidec Sankyo Corporation (JP)

( * ) Notice: Subject to any disclaimer, the term of this patent is extended or adjusted under 35 U.S.C. 154(b) by 261 days.

(21) Appl. No.: 12/908,127

(22) Filed: Oct. 20, 2010

(65) Prior Publication Data

US 2011/0089781 A1 Apr. 21, 2011

(30) Foreign Application Priority Data

Oct. 20, 2009 (JP) ................................. 2009-241783

(51) Int. Cl.
*H02K 1/27* (2006.01)
*H02K 37/14* (2006.01)

(52) U.S. Cl.
CPC ....................................... *H02K 37/14* (2013.01)
USPC ................... 310/156.21; 310/43; 310/156.12; 310/156.29

(58) Field of Classification Search
USPC ............. 310/156.21, 156.12, 156.14, 156.29, 310/43
See application file for complete search history.

(56) References Cited

U.S. PATENT DOCUMENTS

| | | | | |
|---|---|---|---|---|
| 4,035,676 A * | 7/1977 | Adair | ....................... | 310/156.12 |
| 4,035,677 A * | 7/1977 | Kusayama et al. | ...... | 310/156.12 |
| 4,841,190 A * | 6/1989 | Matsushita et al. | ........... | 310/257 |
| 4,973,872 A * | 11/1990 | Dohogne | .................. | 310/156.28 |
| 5,283,495 A * | 2/1994 | Wendel et al. | ................ | 310/257 |
| 5,402,025 A * | 3/1995 | Saito et al. | ................ | 310/156.27 |
| 6,984,908 B2 * | 1/2006 | Rinholm et al. | ......... | 310/156.08 |
| 7,120,986 B2 * | 10/2006 | Kojima et al. | ................... | 29/596 |
| 7,164,216 B2 * | 1/2007 | Shimoyama | ............... | 310/49.32 |
| 7,679,251 B2 * | 3/2010 | Ohkawa et al. | .......... | 310/156.12 |
| 2007/0138890 A1* | 6/2007 | Yu | ............................ | 310/156.22 |
| 2009/0108686 A1* | 4/2009 | Jeung | ............................. | 310/51 |

FOREIGN PATENT DOCUMENTS

| | | | |
|---|---|---|---|
| JP | 51-121110 | * | 10/1976 |
| JP | 56-103957 | * | 8/1981 |
| JP | 56-157249 | * | 12/1981 |
| JP | 63-213443 | * | 9/1988 |
| JP | 2009-22096 | * | 1/2009 |
| JP | 2009-189236 A | | 8/2009 |

* cited by examiner

*Primary Examiner* — Burton Mullins
(74) *Attorney, Agent, or Firm* — Cantor Colburn LLP (57) ABSTRACT

A rotor for motor may include a rotation shaft, a permanent magnet structured in a tube-like shape and fixed to an outer peripheral side of the rotation shaft, and a sleeve which is structured in a tube-like shape, disposed between an outer peripheral face of the rotation shaft and an inner peripheral face of the permanent magnet, and press-fitted and fixed to the outer peripheral face of the rotation shaft. The sleeve is retreated from an end part of the permanent magnet on one side in an axial direction to the other side in the axial direction so that a first ring-shaped recessed part is formed between the rotation shaft and the permanent magnet and the rotation shaft and the permanent magnet are fixed to each other with a first adhesive in the first ring-shaped recessed part. The rotor may be applied to a motor, preferably to a stepping motor.

13 Claims, 3 Drawing Sheets

ROTOR FOR MOTOR AND MOTOR

CROSS REFERENCE TO RELATED APPLICATION

The present invention claims priority under 35 U.S.C. §119 to Japanese Application No. 2009-241783 filed Oct. 20, 2009, the entire content of which is incorporated herein by reference.

FIELD OF THE INVENTION

At least an embodiment of the present invention may relate to a rotor for motor and a motor.

BACKGROUND

For example, a stepping motor among various motors includes a stator provided with a coil bobbin around which a coil wire is wound and a stator member and a rotor (rotor for motor). The rotor is provided with a tube-shaped permanent magnet on an outer peripheral side of a rotation shaft and, conventionally, the permanent magnet is press-fitted and fixed to the rotation shaft (see Japanese Patent Laid-Open No. 2009-189236).

The motor is required to enhance followability in a high-speed region but, in order to attain this purpose, inertia of the rotor is required to be reduced. However, in the rotor for motor described in the above-mentioned Patent Literature, a weight of the permanent magnet is typically relatively heavy and thus the inertia of the rotor is relatively large, thus creating an inherent problem.

SUMMARY

In view of the problem described above, at least an embodiment of the present invention may advantageously provide a rotor for motor which is capable of having a reduced weight relative to know rotors.

According to at least an embodiment of the present invention, there may be provided a rotor for motor including a rotation shaft, a permanent magnet which is structured in a tube-like shape and fixed to an outer peripheral side of the rotation shaft, and a sleeve which is structured in a tube-like shape, disposed between an outer peripheral face of the rotation shaft and an inner peripheral face of the permanent magnet, and press-fitted and fixed to the outer peripheral face of the rotation shaft. The sleeve is retreated from an end part of the permanent magnet on one side in an axial direction to the other side in the axial direction so that a first ring-shaped recessed part is formed between the rotation shaft and the permanent magnet, and the rotation shaft and the permanent magnet are fixed to each other with a first adhesive in the first ring-shaped recessed part.

In the rotor for motor in accordance with an embodiment of the present invention, a sleeve in a tube-like shape which is press-fitted and fixed to the outer peripheral face of the rotation shaft is disposed between the outer peripheral face of the rotation shaft and the inner peripheral face of the permanent magnet. Therefore, even when the outer diameter dimension of the permanent magnet is not reduced, the thickness of the permanent magnet is made thinner by a thickness of the sleeve and thus the weight of the permanent magnet is reduced. Accordingly, the weight of the rotor for motor is reduced. As a result, in the motor using the rotor to which the present invention is applied, inertia of the rotor is smaller and thus followability in a high-speed region is superior compared to a conventional device, i.e., one having no sleeve. Further, the sleeve is retreated from the end part of the permanent magnet on the one side in the axial direction to the other side in the axial direction to form the first ring-shaped recessed part between the rotation shaft and the permanent magnet. Therefore, the rotation shaft and the permanent magnet are fixed to each other by supplying a first adhesive to the first ring-shaped recessed part. In this case, since the first adhesive is located in the first ring-shaped recessed part, the first adhesive is not protruded from the end part of the permanent magnet to the outer side.

In accordance with an embodiment of the present invention, the sleeve may be made of metal or resin. In accordance with an embodiment, it is preferable that the sleeve is made of resin. According to this structure, the weight of the sleeve is reduced and thus the weight of the rotor for motor is reduced.

In accordance with an embodiment of the present invention, the first adhesive fixes the rotation shaft, the sleeve and the permanent magnet to each other in the first ring-shaped recessed part. Specifically, it may be structured that the first ring-shaped recessed part is formed so that a part of an inner peripheral face of a center hole of the permanent magnet is exposed, and the first adhesive adhesively fixes, preferably over the entire peripheries respectively, the outer peripheral face of the rotation shaft, an end face on the one side in the axial direction of the sleeve, and the exposed inner peripheral face of the center hole of the permanent magnet to each other. According to this structure, the rotation shaft, the sleeve and the permanent magnet are fixed to each other firmly.

In accordance with an embodiment of the present invention, an outer peripheral face of the sleeve is formed with an outer peripheral side stepped part which is recessed from the end face on the one side in the axial direction of the sleeve, an outer peripheral side recessed part is formed by the outer peripheral side stepped part and the inner peripheral face of the center hole of the permanent magnet so as to be in communication with the first ring-shaped recessed part, and the first adhesive is entered into the outer peripheral side recessed part. According to this structure, when the first adhesive is entered into the outer peripheral side recessed part, the sleeve and the permanent magnet are fixed to each other further firmly. Further, even when the first adhesive is not entered into the outer peripheral side recessed part entirely, since the outer peripheral side recessed part functions as a reservoir part for the first adhesive, the first adhesive is restrained from protruding from the first ring-shaped recessed part to the outer side.

In accordance with an embodiment of the present invention, an inner peripheral face of the sleeve is formed with an inner peripheral side stepped part which is recessed from the end face on the one side in the axial direction of the sleeve, an inner peripheral side recessed part is formed by the inner peripheral side stepped part and the outer peripheral face of the rotation shaft so as to be in communication with the first ring-shaped recessed part, and the first adhesive is entered into the inner peripheral side recessed part. According to this structure, when the first adhesive is entered into the inner peripheral side recessed part, the sleeve and the permanent magnet are fixed to each other further firmly. Further, even when the first adhesive is not entered into the inner peripheral side recessed part entirely, the inner peripheral side recessed part functions as a reservoir part for the first adhesive and thus the first adhesive is restrained from protruding from the first ring-shaped recessed part to the outer side.

In accordance with an embodiment of the present invention, the inner peripheral face of the sleeve is formed with another inner peripheral side stepped part which is recessed from an end face on the other side in the axial direction of the sleeve, and a region of the inner peripheral face of the sleeve which is sandwiched by the inner peripheral side stepped part which is recessed from the end face on the one side and the another inner peripheral side stepped part which is recessed from the end face on the other side is formed as a small diameter part where the inner peripheral face of the sleeve is abutted with the outer peripheral face of the rotation shaft. According to this structure, a press-fitting margin (press-fitting length) when the rotation shaft is press-fitted into the sleeve is shorter and thus the stress at the time of press-fitting is relaxed. Therefore, when the rotation shaft is to be press-fitted to the sleeve, damage or excessive deformation is hard to occur in the sleeve and thus the permanent magnet is satisfactorily mounted on the outer face of the sleeve.

In accordance with an embodiment of the present invention, a region of an outer peripheral face of the sleeve which is located on an outer side in a radial direction with respect to a region where an inner peripheral face of the sleeve is abutted with the outer peripheral face of the rotation shaft is formed with a peripheral groove which is recessed to an inner side in the radial direction from the outer peripheral face of the sleeve. According to this structure, the peripheral groove is provided with an effect for relaxing the stress at the time of press-fitting when the rotation shaft is to be press-fitted to the sleeve. Therefore, when the rotation shaft is to be press-fitted to the sleeve, damage or excessive deformation is hard to occur in the sleeve and thus the permanent magnet is satisfactorily mounted on the outer face of the sleeve.

In accordance with an embodiment of the present invention, the outer peripheral face of the sleeve and the inner peripheral face of the permanent magnet is fixed to each other with a second adhesive applied to the peripheral groove. According to this structure, the sleeve and the permanent magnet are fixed to each other further firmly by using the second adhesive applied to the peripheral groove.

In a motor provided with the rotor to which the present invention is applied, it is preferable that the sleeve is retreated from another end part of the permanent magnet on the other side in the axial direction to the one side in the axial direction so that a second ring-shaped recessed part is formed between the rotation shaft and the permanent magnet, and a part of a bearing member which rotatably supports the rotation shaft is entered into the second ring-shaped recessed part. According to this structure, a dimension in the axial direction of the motor is reduced.

In accordance with an embodiment of the present invention, the first ring-shaped recessed part is located on an output side where rotation of the rotation shaft is outputted and the second ring-shaped recessed part is located on an opposite-to-output side which is an opposite side to the side where the rotation of the rotation shaft is outputted.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A stepping motor will be described below as a motor to which the present invention is applied with reference to the accompanying drawings. In the following descriptions, "a rotor for motor" is simply referred to as a "rotor".

Figure 1A:
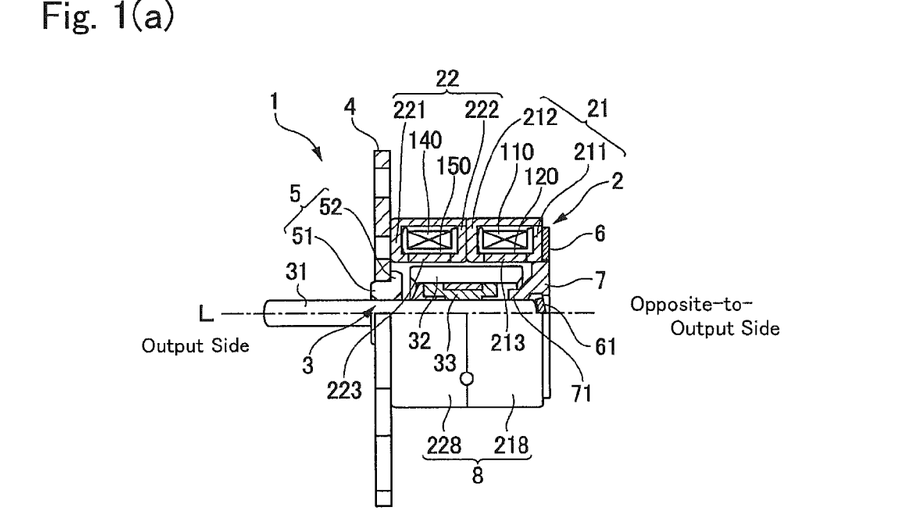
FIGS. 1(a), 1(b) and 1(c) are explanatory views showing a motor in accordance with an embodiment of the present invention.
Figure 1B:
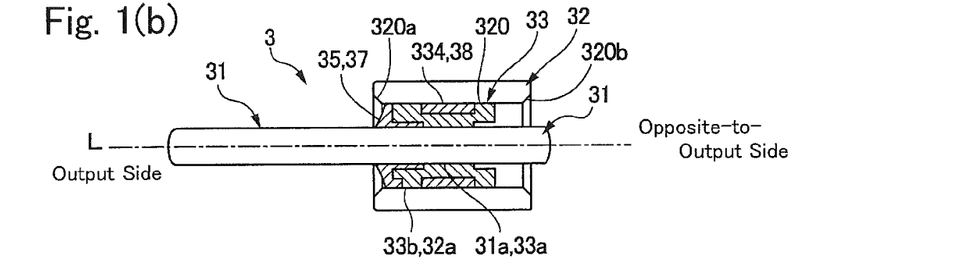
Figure 1C:
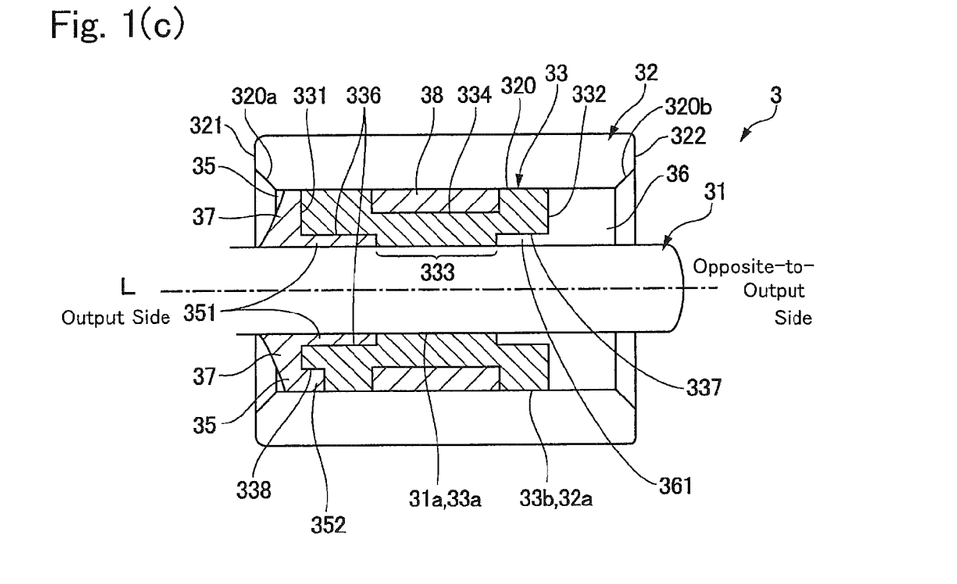

FIGS. 1(a), 1(b) and 1(c) are explanatory views showing a motor to which the present invention is applied. FIG. 1(a) is a side view showing a motor, a part of which is cut off, FIG. 1(b) is a cross-sectional view showing a rotor (rotor for motor), and FIG. 1(c) is an enlarged sectional view showing a part of the rotor.

A motor 1 shown in FIG. 1(a) is a stepping motor, which is provided with a stator 2 formed or structured in a cylindrical tube shape and a rotor 3 (rotor for motor) which is disposed on an inner peripheral side of the stator 2. The rotor 3 is provided with a rotation shaft 31 and a permanent magnet 32 in a cylindrical tube shape which is coaxially attached to an outer peripheral side of the rotation shaft 31. In this embodiment, a sleeve 33 described below is disposed between the rotation shaft 31 and the permanent magnet 32.

A first end plate 4 is fixed to an end face on an output side of the stator 2 and the first end plate 4 holds a first bearing 5 which rotatably supports the rotation shaft 31 around its axial line. The first bearing 5 is formed of an oil-impregnated sintered bearing or the like and provided with a cylindrical tube part 51, which penetrates through the first end plate 4, and a flange part 52 whose diameter is enlarged from an end part on an opposite-to-output side of the cylindrical tube part 51 and which is abutted with a face on the opposite-to-output side of the first end plate 4. The flange part 52 is protruded toward the opposite-to-output side from the first end plate 4. A second end plate 6 is fixed to an end face on the opposite-to-output side of the stator 2. The second end plate 6 holds a second bearing 7 which rotatably supports the rotation shaft 31 around its axial line. The second bearing 7 is protruded toward the output side from the second end plate 6.

The stator 2 is provided with a first stator assembly 21 and a second stator assembly 22 which are disposed in a front and rear direction along the axial line of the rotation shaft 31. The first stator assembly 21 is provided with a coil bobbin 120 around which a coil wire 110 is wound and a ring-shaped outer stator core 211 and a ring-shaped inner stator core 212 on both sides in an axial direction "L" of the coil bobbin 120. Both of the outer stator core 211 and the inner stator core 212 are formed of a magnetic metal member which forms a magnetic path. Each of the outer stator core 211 and the inner stator core 212 is provided with a plurality of pole teeth 213 which are stood up from its inner circumferential edge. The pole teeth 213 of the outer stator core 211 and the pole teeth 213 of the inner stator core 212 are alternately disposed in a juxtaposed manner in a circumferential direction on an inner peripheral side of the coil bobbin 120 and face the outer peripheral face of the permanent magnet 32. The outer stator core 211 is integrally formed with a cylindrical tube part 218 which structures a part of a motor case 8.

The second stator assembly 22 is, similarly to the first stator assembly 21, provided with a coil bobbin 150 around which a coil wire 140 is wound and a ring-shaped outer stator core 221 and a ring-shaped inner stator core 222 on both sides in the axial direction "L" of the coil bobbin 150. Both of the outer stator core 221 and the inner stator core 222 are formed of a magnetic metal member which forms a magnetic path. Each of the outer stator core 221 and the inner stator core 222 is provided with a plurality of pole teeth 223 which are stood up from its inner circumferential edge. The pole teeth 223 of the outer stator core 221 and the pole teeth 223 of the inner stator core 222 are alternately disposed in a juxtaposed manner in a circumferential direction on an inner peripheral side of the coil bobbin 150 and face the outer peripheral face of the permanent magnet 32. The outer stator core 221 is integrally formed with a cylindrical tube part 228 which structures a part of a motor case 8.

Figure 2A:
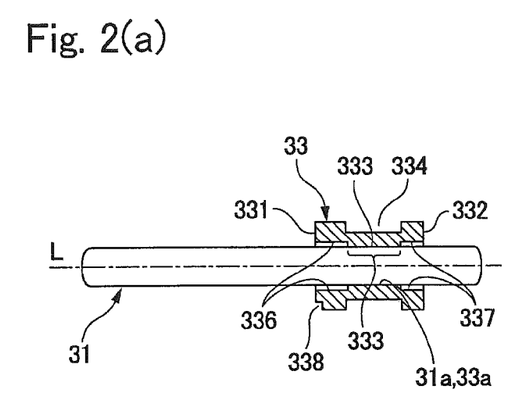
FIGS. 2(a) through 2(d) are explanatory views showing a rotor (rotor for motor) which is used in the motor shown in FIGS. 1(a), 1(b) and 1(c).
Figure 2B:
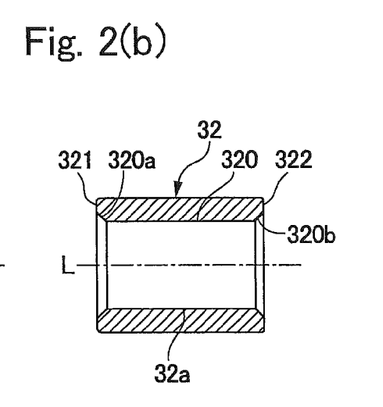
Figure 2C:
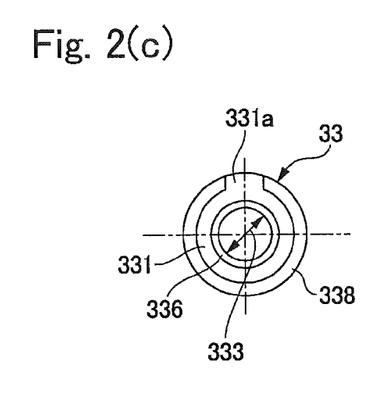
Figure 2D:
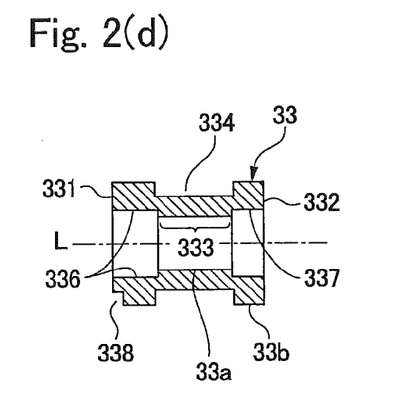

FIGS. 2(a), 2(b), 2(c) and 2(d) are explanatory views showing the rotor 3 which is used in the motor shown in FIG. 1(a). FIG. 2(a) is a side view showing a state in which a permanent magnet is detached from the rotor 3, FIG. 2(b) is a cross-sectional view showing the permanent magnet 32, FIG. 2(c) is a front view showing a sleeve 33 which is viewed from the output side, and FIG. 2(d) is a cross-sectional view showing the sleeve.

As shown in FIGS. 1(a) through 1(c) and FIGS. 2(a) through 2(d), in the rotor 3 which is used in the motor 1 in this embodiment, the rotation shaft 31 is a round bar made of metal such as SUS and the permanent magnet 32 is a rare earth magnet made of "Ne—Fe—B" or the like. An end part 321 on the output side and an end part 322 on the opposite-to-output side of the permanent magnet 32 are respectively formed with tapered faces 320a and 320b which are inclined toward circumferential edges of a center hole 320. Outer circumferential edges of the end part 321 and the end part 322 are formed in an "R"-shape. In order to structure the rotor 3 by using the rotation shaft 31 and the permanent magnet 32, in this embodiment, the sleeve 33 in a cylindrical tube shape is press-fitted and fixed to an outer peripheral face 31a of the rotation shaft 31 and the permanent magnet 32 is mounted on the outer peripheral face of the sleeve 33.

The sleeve 33 is made of metal or resin. In this embodiment, the sleeve 33 is made of resin and, in consideration of a heat resisting property and an adhesive property, resin whose material is polycarbonate is used. In accordance with an embodiment, liquid crystal polymer may be used for the sleeve 33.

In this embodiment, a dimension in an axial direction "L" (length dimension) of the sleeve 33 is shorter than a dimension in the axial direction "L" (length dimension) of the permanent magnet 32. Therefore, the sleeve 33 is retreated from the end part 321 of the permanent magnet 32 on the output side (one side) in the axial direction "L" to the opposite-to-output side (the other side) in the axial direction "L" so that a part of an inner peripheral face 32a of the center hole 320 of the permanent magnet 32 is exposed. As a result, a first ring-shaped recessed part 35 is formed between the rotation shaft 31 and the exposed inner peripheral face 32a of the permanent magnet 32. Further, the sleeve 33 is retreated from the end part 322 of the permanent magnet 32 on the opposite-to-output side (the other side) in the axial direction "L" to the output side (one side) in the axial direction "L" so that a part of an inner peripheral face 32a of the center hole 320 of the permanent magnet 32 is exposed. As a result, a second ring-shaped recessed part 36 is formed between the rotation shaft 31 and the exposed inner peripheral face 32a of the permanent magnet 32.

An inner peripheral face 33a of the sleeve 33 is formed with an inner peripheral side stepped part 336 in a ring shape which is recessed from an end face 331 on the output side in the axial direction "L". As a result, an inner peripheral side recessed part 351 which is in communication with the first ring-shaped recessed part 35 is formed in a ring shape over the entire periphery by the inner peripheral side stepped part 336 and the outer peripheral face 31a of the rotation shaft 31. In this embodiment, the inner peripheral side stepped part 336 is formed at a position located on the output side in the axial direction "L" with respect to a peripheral groove 334 described below. Therefore, the inner peripheral side stepped part 336 is located at a position on an inner side in a radial direction with respect to a portion where an outer peripheral face 33b of the sleeve 33 and the inner peripheral face 32a of the permanent magnet 32 are overlapped with each other on the output side with respect to the peripheral groove 334. In this embodiment, a length dimension of the inner peripheral side stepped part 336 is substantially equal to a length dimension of the portion where the outer peripheral face 33b of the sleeve 33 and the inner peripheral face 32a of the permanent magnet 32 are overlapped with each other on the output side with respect to the peripheral groove 334. Specifically, the length dimension of the inner peripheral side stepped part 336 is set to be slightly longer than the length dimension of the portion where the outer peripheral face 33b of the sleeve 33 and the inner peripheral face 32a of the permanent magnet 32 are overlapped with each other on the output side with respect to the peripheral groove 334. However, the length dimension of the inner peripheral side stepped part 336 may be set equal to or slightly shorter than the length dimension of the portion where the outer peripheral face 33b of the sleeve 33 and the inner peripheral face 32a of the permanent magnet 32 are overlapped with each other.

Further, the inner peripheral face 33a of the sleeve 33 is formed with an inner peripheral side stepped part 337 in a ring shape which is recessed from an end face 332 on the opposite-to-output side in the axial direction "L". As a result, an inner peripheral side recessed part 361 which is in communication with the second ring-shaped recessed part 36 is formed in a ring shape over the entire periphery by the inner peripheral side stepped part 337 and the outer peripheral face 31a of the rotation shaft 31. In this embodiment, the inner peripheral side stepped part 337 is formed at a position located on the opposite-to-output side in the axial direction "L" with respect to the peripheral groove 334. Therefore, the inner peripheral side stepped part 337 is located at a position on an inner side in a radial direction with respect to a portion where the outer peripheral face 33b of the sleeve 33 and the inner peripheral face 32a of the permanent magnet 32 are overlapped with each other on the opposite-to-output side with respect to the peripheral groove 334. In this embodiment, a length dimension of the inner peripheral side stepped part 337 is substantially equal to a length dimension of the portion where the outer peripheral face 33b of the sleeve 33 and the inner peripheral face 32a of the permanent magnet 32 are overlapped with each other on the opposite-to-output side with respect to the peripheral groove 334. Specifically, the length dimension of the inner peripheral side stepped part 337 is set to be slightly longer than the length dimension of the portion where the outer peripheral face 33b of the sleeve 33 and the inner peripheral face 32a of the permanent magnet 32 are overlapped with each other on the opposite-to-output side with respect to the peripheral groove 334. However, the length dimension of the inner peripheral side stepped part 337 may be set equal to or slightly shorter than the length dimension of the portion where the outer peripheral face 33b of the sleeve 33 and the inner peripheral face 32a of the permanent magnet 32 are overlapped with each other.

Both end sides of the inner peripheral face 33a of the sleeve 33 in the axial direction "L" are formed to be large diameter parts by forming of the inner peripheral side stepped parts 336 and 337 and a substantially center portion of the sleeve 33 in the axial direction "L" (region sandwiched by the inner peripheral side stepped parts 336 and 337) is formed to be a small diameter part 333. Therefore, when the sleeve 33 in a cylindrical tube shape is press-fitted and fixed to the outer peripheral face 31a of the rotation shaft 31, only a small diameter part 333 of the inner peripheral face 33a of the sleeve 33 is abutted with the outer peripheral face 31a of the rotation shaft 31. Therefore, a press-fitting margin or a press-fitting length when the rotation shaft 31 is press-fitted into the sleeve 33 is shorter.

Further, a region of the outer peripheral face 33b of the sleeve 33 which is located on the outer side in the radial direction with respect to a region (small diameter part 333) where the inner peripheral face 33a of the sleeve 33 is abutted with the outer peripheral face 31a of the rotation shaft 31 is formed with the peripheral groove 334 which is recessed to the inner side in the radial direction from the outer peripheral face 33b of the sleeve 33. The peripheral groove 334 functions to relax stress at the time of press-fitting by reducing a wall thickness of the small diameter part 333 of the sleeve 33. In this embodiment, a depth of the peripheral groove 334 is set to be a dimension substantially equal to the wall thickness of the small diameter part 333. A depth dimension and a length dimension of the peripheral groove 334 (wall thickness and length dimension of the small diameter part 333) are set to be appropriate values in consideration of strength of the sleeve 33 when the sleeve 33 is press-fitted into the rotation shaft 31.

An outer peripheral face 33b of the sleeve 33 is formed with an outer peripheral side stepped part 338 which is recessed from the end face 331 on the output side in the axial direction "L" and an outer peripheral side recessed part 352 which is in communication with the first ring-shaped recessed part 35 is formed by the outer peripheral side stepped part 338 and the inner peripheral face 32a of the permanent magnet 32. In this embodiment, the outer peripheral side stepped part 338 is formed over an angular range of about 300° in the end face 331 located on the output side of the sleeve 33. Therefore, a relatively wider region 331a is left in the end face 331 of the sleeve 33 over an angular range of about 60° which is sandwiched by both ends of the outer peripheral side stepped part 338. This region is utilized as a gate position when the sleeve 33 is molded by using resin. However, since the sleeve 33 is retreated from the end part 321 of the permanent magnet 32 on the output side (one side) in the axial direction "L" to the opposite-to-output side (the other side) in the axial direction "L", even when a gate trace is left on the end face 331 of the sleeve 33 as a protruded part, the protruded part is not protruded from the end part 321 of the permanent magnet 32.

A fixing structure of the rotation shaft 31, the permanent magnet 32 and the sleeve 33 to each other will be described below while describing a manufacturing method for the rotor 3 with reference to FIGS. 1(a) through 1(c) and FIGS. 2(a) through 2(d).

In order to manufacture the rotor 3 for the motor 1 in this embodiment, first, as shown in FIG. 2(a), the rotation shaft 31 is press-fitted and fixed to the sleeve 33. Next, after an adhesive 38 (second adhesive/see FIG. 1(c)) is coated and filled to the peripheral groove 334 of the sleeve 33, the permanent magnet 32 shown in FIG. 2(b) is mounted on the outer side of the sleeve 33. The adhesive 38 is an anaerobic epoxy system adhesive or the like.

Next, an adhesive 37 (first adhesive/see FIG. 1(c)) is coated and filled to the first ring-shaped recessed part 35 which is formed between the rotation shaft 31 and the end part 321 of the permanent magnet 32. The adhesive 37 is an anaerobic or a UV-curable epoxy system adhesive or the like. In this embodiment, the inner peripheral side recessed part 351 which is in communication with the first ring-shaped recessed part 35 is formed by the inner peripheral side stepped part 336 formed on the inner peripheral face 33a of the sleeve 33 and thus the adhesive 37 is entered into the inside of the inner peripheral side recessed part 351. Further, the outer peripheral side recessed part 352 which is in communication with the first ring-shaped recessed part 35 is formed by the outer peripheral side stepped part 338 formed on the outer peripheral face 33b of the sleeve 33 and thus the adhesive 37 is also entered into the inside of the outer peripheral side recessed part 352.

After that, the adhesives 37 and 38 are cured. The rotation shaft 31 and the permanent magnet 32 are fixed to each other by the adhesive 37 in the first ring-shaped recessed part 35. In this case, the adhesive 37 is contacted with all of the outer peripheral face 31a of the rotation shaft 31, the end face 331 of the sleeve 33, and the exposed inner peripheral face 32a of the permanent magnet 32 in the first ring-shaped recessed part 35 and thus the rotation shaft 31, the sleeve 33 and the permanent magnet 32 are fixed to each other by the adhesive 37. In other words, the adhesive 37 performs fixing of the sleeve 33 to the permanent magnet 32, fixing of the sleeve 33 to the rotation shaft 31, and fixing of the rotation shaft 31 to the permanent magnet 32. In this case, even when the adhesive 37 is supplied rather too much amount to the first ring-shaped recessed part 35 so that the outer peripheral face 31a of the rotation shaft 31, the end face 331 of the sleeve 33 and the exposed inner peripheral face 32a of the permanent magnet 32 are adhesively fixed to each other over the entire periphery, the first ring-shaped recessed part 35 are formed so as to be in communication with the inner peripheral side recessed part 351 and the outer peripheral side recessed part 352 and thus the inner peripheral side recessed part 351 and the outer peripheral side recessed part 352 function as reservoir parts for the adhesive 37. Therefore, the adhesive 37 is not protruded from the first ring-shaped recessed part 35 to the outer side. In accordance with an embodiment of the present invention, even when the adhesive 37 is not applied to the entire periphery in the first ring-shaped recessed part 35 completely so that a portion without the adhesive 37 is left in the first ring-shaped recessed part 35, the effect of the present invention can be attained when the adhesive 37 is supplied over the substantially entire periphery.

Figure 3A:
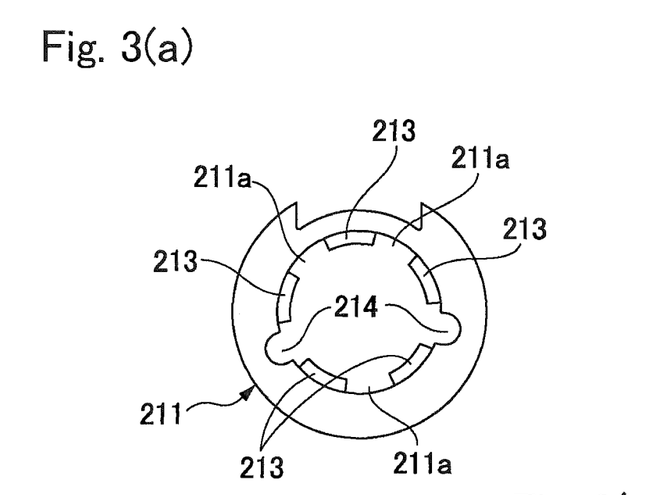
FIGS. 3(a) through 3(d) are explanatory views showing a bearing structure on an opposite-to-output side in the motor shown in FIGS. 1(a), 1(b) and 1(c).
Figure 3B:
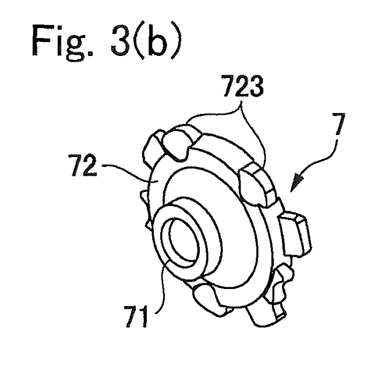
Figure 3C:
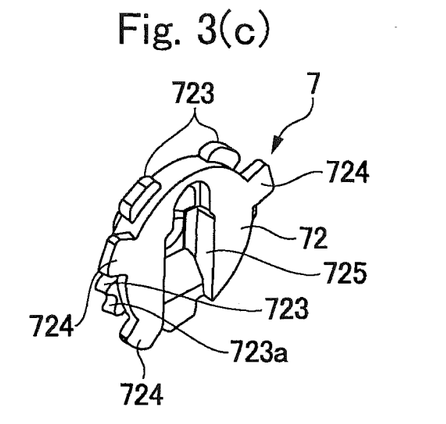
Figure 3D:
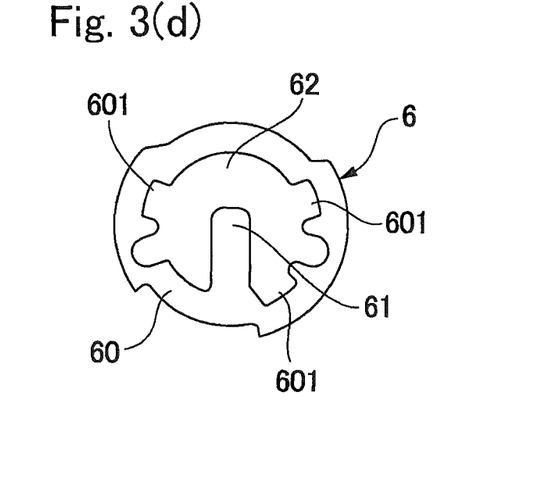

FIGS. 3(a) through 3(d) are explanatory views showing a bearing structure on the opposite-to-output side in the motor shown in FIGS. 1(a), 1(b) and 1(c). FIG. 3(a) is a rear view showing the outer stator core 211 which is viewed from the opposite-to-output side, FIG. 3(b) is a perspective view showing a second bearing 7 which is viewed from the output side obliquely, FIG. 3(c) is a perspective view showing the second bearing 7 which is viewed from the opposite-to-output side obliquely, and FIG. 3(d) is a front view showing a second end plate 6 which presses the second bearing 7.

As described with reference to FIGS. 1(a) through 1(c) and FIGS. 2(a) through 2(d), in this embodiment, the rotation shaft 31, the sleeve 33 and the permanent magnet 32 are fixed to each other by the adhesive 37 in the first ring-shaped recessed part 35. On the other hand, the second ring-shaped recessed part 36 which is formed on the opposite-to-output side of the sleeve 33 is not used for adhesively fixing the rotation shaft 31, the sleeve 33 and the permanent magnet 32 to each other. In other words, as shown in FIG. 1(a), a part of the second bearing 7 (tip end part of bearing part 71) is inserted into the second ring-shaped recessed part 36. In this embodiment, the second bearing 7 is fixed to an end face on the opposite-to-output side of the outer stator core 211 by the second end plate 6.

The second bearing 7 is, for example, formed of resin material. In FIGS. 3(b) and 3(c), the second bearing 7 is provided with a bearing part 71 in a cylindrical tube shape, which is capable of supporting an end part on the opposite-to-output side of the rotation shaft 31 of the rotor 3 in the radial direction, and a flange part 72 in a plate shape which is capable of being fitted to the outer stator core 211. Further, the flange part 72 is formed with a rectangular window portion 725 which is in communication with an inner side of the bearing part 71. The second bearing 7 is press-fitted and fixed to the inside of the stator 2 (inner side of the outer stator core 211) from the opposite-to-output side. In this case, the flange part 72 is press-fitted to the outer stator core 211. More specifically, the flange part 72 is formed in a disk-like shape and formed with first protruded parts 723, which are entered into recessed parts 211a radially recessed between a plurality of pole teeth 213 of the outer stator core 211, and second protruded parts 724 which are abutted with end faces of portions where the pole teeth 213 are formed. In this manner, the position in the radial direction and the position to the output side in the axial direction "L" of the second bearing 7 are determined. In this embodiment, a tip end edge of one of the first protruded parts 723 is formed in a circular arc shape and the edge portion of the circular arc part 723a is fitted with an edge portion of a semicircular recessed part 214 of the outer stator core 211. Therefore, positions in the circumferential direction of the outer stator core 211 and the second bearing 7 are determined by utilizing the circular arc part 723a and the semicircular recessed part 214.

Further, the second end plate 6 shown in FIG. 3(d) is a thin metal member such as SUS and provided with a function for pressing the second bearing 7 to apply pressurization to the rotation shaft 31. More specifically, the second end plate 6 is structured of a roughly ring-shaped main body part 60, which is attached to the end face on the opposite-to-output side of the stator 2 (end face of the outer stator core 211), and an urging part 61 which urges an shaft end on the opposite-to-output side of the rotation shaft 31. The urging part 61 functions as a flat spring through a cut-out portion 62 which is formed between the main body part 60 and the urging part 61. The main body part 60 is provided with joining recessed parts 601 which are used as a fixing part to the outer stator core 211 and fixed to the stator 2 in a state where the flange part 72 of the bearing part 71 is sandwiched between the outer stator core 211 and the main body part 60.

In this state, the urging part 61 is abutted with the shaft end on the opposite-to-output side of the rotation shaft 31 through the window portion 725 of the second bearing 7 to urge the rotation shaft 31 toward the output side. Further, a part of the second bearing 7 (tip end part of the bearing part 71) is entered into the second ring-shaped recessed part 36.

As described above, in the rotor 3 for the motor 1 in this embodiment, the sleeve 33 in a tube-like shape is provided between the outer peripheral face 31a of the rotation shaft 31 and the inner peripheral face 32a of the permanent magnet 32 and is press-fitted and fixed to the outer peripheral face of the rotation shaft 31. Therefore, even when the outer diameter dimension of the permanent magnet 32 is not reduced, the thickness of the permanent magnet 32 is made thinner by the thickness of the sleeve 33 and thus the weight of the permanent magnet 32 is reduced. Further, in this embodiment, the sleeve 33 is made of resin and lightweight. Therefore, the weight of the rotor 3 is reduced. Accordingly, in the motor 1 with the use of the rotor 3 in this embodiment, inertia of the rotor 3 is smaller and thus followability in a high-speed region is superior. Further, since the sleeve 33 is made of resin, even when temperature rises, stress for causing the permanent magnet 32 to drop is hard to be generated.

Further, the sleeve 33 is retreated from the end part 321 of the permanent magnet 32 on the output side to the opposite-to-output side in the axial direction "L" to form the first ring-shaped recessed part 35 between the rotation shaft 31 and the permanent magnet 32. Therefore, an adhering surface with the adhesive 37 is secured on the inner peripheral face 32a of the permanent magnet 32 and thus the adhesive 37 (first adhesive) is sufficiently supplied to the first ring-shaped recessed part 35 to fix the rotation shaft 31 and the permanent magnet 32 to each other with the adhesive 37. Further, in this embodiment, since the adhesive 37 fixes the rotation shaft 31, the sleeve 33 and the permanent magnet 32 to each other in the first ring-shaped recessed part 35, the rotation shaft 31, the sleeve 33 and the permanent magnet 32 are firmly fixed to each other. In this case, since the sleeve 33 is retreated from the end part 321 of the permanent magnet 32 to the opposite-to-output side in the axial direction "L" so that a part of the inner peripheral face 32a of the permanent magnet 32 is exposed, the adhesive 37 is located in the first ring-shaped recessed part 35 because the exposed inner peripheral face 32a is formed and thus the adhesive 37 is hard to be protruded to the output side with respect to the end part 321 of the permanent magnet 32. Therefore, a malfunction is hard to occur in which a protruded portion of the adhesive 37 is abutted with the flange part 52 of the first bearing 5.

Further, the outer peripheral side recessed part 352 which is in communication with the first ring-shaped recessed part 35 is formed by the outer peripheral side stepped part 338 formed on the outer peripheral face 33b of the sleeve 33 and the inner peripheral face 32a of the permanent magnet 32. Therefore, the sleeve 33 and the permanent magnet 32 are fixed to each other further firmly by means of that the adhesive 37 is entered into the outer peripheral side recessed part 352. Further, even when the adhesive 37 is not entered into the entire outer peripheral side recessed part 352, since the outer peripheral side recessed part 352 functions as a reservoir part for the adhesive 37, the adhesive 37 is restrained from protruding from the first ring-shaped recessed part 35 to the outer side.

Further, the inner peripheral side recessed part 351 which is in communication with the first ring-shaped recessed part 35 is formed by the inner peripheral side stepped part 336 formed on the inner peripheral face 33a of the sleeve 33 and the outer peripheral face 31a of the rotation shaft 31. Therefore, the sleeve 33 and the rotation shaft 31 are fixed to each other further firmly by means of that the adhesive 37 is entered into the inner peripheral side recessed part 351. Further, even when the adhesive 37 is not entered into the entire inner peripheral side recessed part 351, the inner peripheral side recessed part 351 functions as a reservoir part for the adhesive 37 and thus the adhesive 37 is restrained from protruding from the first ring-shaped recessed part 35 to the outer side.

Moreover, a region of the inner peripheral face 33a of the sleeve 33 sandwiched by the inner peripheral side stepped parts 336 and 337 is formed as the small diameter part 333 and thus a press-fitting margin (press-fitting length) when the rotation shaft 31 is press-fitted into the sleeve 33 is shorter. Further, the peripheral groove 334 which is recessed to the inner side in the radial direction from the outer peripheral face 33b of the sleeve 33 is formed in a region located on the outer side in the radial direction with respect to the region where the inner peripheral face 33a of the sleeve 33 is abutted with the outer peripheral face 31a of the rotation shaft 31 (small diameter part 333). The peripheral groove 334 is provided with an effect for relaxing the stress at the time of press-fitting when the rotation shaft 31 is press-fitted to the sleeve 33. Therefore, when the rotation shaft 31 is to be press-fitted to the sleeve 33, damage or excessive deformation is hard to occur in the sleeve 33 and thus the permanent magnet 32 is satisfactorily mounted on the outer face of the sleeve 33.

Further, in this embodiment, the sleeve 33 and the permanent magnet 32 are fixed to each other by the adhesive 38 (second adhesive) filled in the peripheral groove 334 and thus the sleeve 33 and the permanent magnet 32 are fixed to each other further firmly.

In addition, a part of the second bearing 7 is entered into the second ring-shaped recessed part 36 which is formed on the opposite-to-output side of the sleeve 33 and thus a dimension in the axial direction "L" of the motor 1 is reduced.

In the embodiment described above, the first ring-shaped recessed part 35 is used to adhesively fix the rotation shaft 31, the sleeve 33 and the permanent magnet 32 to each other. However, the second ring-shaped recessed part 36 may be used to adhesively fix the rotation shaft 31, the sleeve 33 and the permanent magnet 32 to each other. Further, both of the first ring-shaped recessed part 35 and the second ring-shaped recessed part 36 may be used to adhesively fix the rotation shaft 31, the sleeve 33 and the permanent magnet 32 to each other. Further, in the embodiment described above, the inner peripheral side stepped part (inner peripheral side stepped parts 336 and 337) are formed on both of the output side and the opposite-to-output side. However, when the rotation shaft 31, the sleeve 33 and the permanent magnet 32 are adhesively fixed to each other only one ring-shaped recessed part, it may be structured that the other ring-shaped recessed part is not formed with the inner peripheral side stepped part. In addition, in the embodiment described above, the ring-shaped recessed part (first ring-shaped recessed part 35 and second ring-shaped recessed part 36) are formed on both of the output side and the opposite-to-output side. However, when the rotation shaft 31, the sleeve 33 and the permanent magnet 32 are adhesively fixed to each other by using only one ring-shaped recessed part, it may be structured that the other ring-shaped recessed part is not formed.

It is preferable that a slight clearance is provided between the outer peripheral face 33b of the sleeve 33 and the inner peripheral face 32a of the permanent magnet 32. In this case, the adhesive 38 may be entered into the clearance between the outer peripheral face 33b of the sleeve 33 and the inner peripheral face 32a of the permanent magnet 32 and alternatively, no adhesive 38 may be entered into the clearance between the outer peripheral face 33b of the sleeve 33 and the inner peripheral face 32a of the permanent magnet 32.

In the embodiment described above, the present invention is applied to the stepping motor 1 but may be applied to other types of motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotor for motor comprising:
   a rotation shaft;
   a permanent magnet which is structured in a tube-like shape and fixed to an outer peripheral side of the rotation shaft; and
   a sleeve which is structured in a tube-like shape, disposed between an outer peripheral face of the rotation shaft and an inner peripheral face of the permanent magnet, and press-fitted and fixed to the outer peripheral face of the rotation shaft;
   wherein a dimension in the axial direction of the sleeve is shorter than a dimension in the axial direction of the permanent magnet, so that a first ring-shaped recessed part is formed between the rotation shaft and the permanent magnet;
   wherein the rotation shaft and the permanent magnet are fixed to each other with a first adhesive in the first ring-shaped recessed part;
   wherein the first adhesive fixes the rotation shaft, the sleeve and the permanent magnet to each other in the first ring-shape recessed part;
   wherein the first ring-shaped recessed part is structured so that a part of an inner peripheral face of a center hole of the permanent magnet is exposed;
   wherein the first adhesive adhesively fixes the outer peripheral face of the rotation shaft, an end face on the one side in the axial direction of the sleeve, and an exposed inner peripheral face of the center hole of the permanent magnet to each other;
   wherein an outer peripheral face of the sleeve is formed with an outer peripheral side stepped part which is recessed from the end face on the one side in the axial direction of the sleeve;
   an outer peripheral side recessed part is formed by the outer peripheral side stepped part and the inner peripheral face of the center hole of the permanent magnet so as to be in communication with the first ring-shaped recessed part; and
   the first adhesive is inserted into the outer peripheral side recessed part.

2. The rotor for motor according to claim 1, wherein the sleeve is made of resin.

3. The rotor for motor according to claim 1, wherein
   a region of an outer peripheral face of the sleeve which is located on an outer side in a radial direction with respect to a region where an inner peripheral face of the sleeve is abutted with the outer peripheral face of the rotation shaft is formed with a peripheral groove which is recessed to an inner side in the radial direction from the outer peripheral face of the sleeve, and
   the outer peripheral face of the sleeve and the inner peripheral face of the permanent magnet is fixed to each other with a second adhesive applied to the peripheral groove.

4. The rotor for motor according to claim 1, wherein a region of an outer peripheral face of the sleeve which is located on an outer side in a radial direction with respect to a region where an inner peripheral face of the sleeve abuts the outer peripheral face of the rotation shaft is formed with a peripheral groove which is recessed to an inner side in the radial direction from the outer peripheral face of the sleeve.

5. The rotor for motor according to claim 4, wherein the outer peripheral face of the sleeve and the inner peripheral face of the permanent magnet are fixed to each other with a second adhesive that is applied to the peripheral groove.

6. A rotor for motor comprising:
a rotation shaft;
a permanent magnet which is structured in a tube-like shape and fixed to an outer peripheral side of the rotation shaft; and
a sleeve which is structured in a tube-like shape, disposed between an outer peripheral face of the rotation shaft and an inner peripheral face of the permanent magnet, and press-fitted and fixed to the outer peripheral face of the rotation shaft;
wherein a dimension in the axial direction of the sleeve is shorter than a dimension in the axial direction of the permanent magnet, so that a first ring-shaped recessed part is formed between the rotation shaft and the permanent magnet; and
wherein the rotation shaft and the permanent magnet are fixed to each other with a first adhesive in the first ring-shaped recessed part;
wherein the first adhesive fixes the rotation shaft, the sleeve and the permanent magnet to each other in the first ring-shaped recessed part;
wherein the first ring-shaped recessed part is structured so that a part of an inner peripheral face of a center hole of the permanent magnet is exposed;
the first adhesive adhesively fixes the outer peripheral face of the rotation shaft, an end face on the one side in the axial direction of the sleeve, and an exposed inner peripheral face of the center hole of the permanent magnet to each other;
wherein an inner peripheral face of the sleeve is formed with an inner peripheral side stepped part which is recessed from the end face on the one side in the axial direction of the sleeve,
an inner peripheral side recessed part is formed by the inner peripheral side stepped part and the outer peripheral face of the rotation shaft so as to be in communication with the first ring-shaped recessed part, and
the first adhesive is inserted into the inner peripheral side recessed part.

7. A rotor for motor comprising:
a rotation shaft;
a permanent magnet which is structured in a tube-like shape and fixed to an outer peripheral side of the rotation shaft; and
a sleeve which is structured in a tube-like shape, disposed between an outer peripheral face of the rotation shaft and an inner peripheral face of the permanent magnet, and press-fitted and fixed to the outer peripheral face of the rotation shaft;
wherein a dimension in the axial direction of the sleeve is shorter than a dimension in the axial direction of the permanent magnet, so that a first ring-shaped recessed part is formed between the rotation shaft and the permanent magnet; and
wherein the rotation shaft and the permanent magnet are fixed to each other with a first adhesive in the first ring-shaped recessed part;
wherein an outer peripheral face of the sleeve is formed with an outer peripheral side stepped part which is recessed from the end face on the one side in the axial direction of the sleeve,
an outer peripheral side recessed part is formed by the outer peripheral side stepped part and the inner peripheral face of the center hole of the permanent magnet so as to be in communication with the first ring-shaped recessed part, and
the first adhesive is inserted into the outer peripheral side recessed part.

8. A rotor for motor comprising:
a rotation shaft;
a permanent magnet which is structured in a tube shape and fixed to an outer peripheral side of the rotation shaft; and
a sleeve which is structured in a tube-like shape, disposed between an outer peripheral face of the rotation shaft and an inner peripheral face of the permanent magnet, and press-fitted and fixed to the outer peripheral face of the rotation shaft;
wherein a dimension in the axial direction of the sleeve is shorter than a dimension in the axial direction of the permanent magnet, so that a first ring-shaped recessed part is formed between the rotation shaft and the permanent magnet; and
wherein the rotation shaft and the permanent magnet are fixed to each other with a first adhesive in the first ring-shaped recessed part;
wherein an inner peripheral face of the sleeve is formed with an inner peripheral side stepped part which is recessed from the end face on the one side in the axial direction of the sleeve,
an inner peripheral side recessed part is formed by the inner peripheral side stepped part and the outer peripheral face of the rotation shaft so as to be in communication with the first ring-shaped recessed part, and
the first adhesive is inserted into the inner peripheral side recessed part.

9. The rotor for motor according to claim 8, wherein
the inner peripheral face of the sleeve is formed with another inner peripheral side stepped part which is recessed from an end face on an other side in the axial direction of the sleeve, and
a region of the inner peripheral face of the sleeve which is sandwiched by the inner peripheral side stepped part which is recessed from the end face on the one side and the another inner peripheral side stepped part which is recessed from the end face on the other side is formed as a small diameter part where the inner peripheral face of the sleeve abuts the outer peripheral face of the rotation shaft.

10. A motor comprising:
a rotor comprising:
a rotation shaft;
a permanent magnet which is structured in a tube-like shape and fixed to an outer peripheral side of the rotation shaft; and
a sleeve which is structured in a tube-like shape, disposed between an outer peripheral face of the rotation shaft and an inner peripheral face of the permanent magnet, and press-fitted and fixed to the outer peripheral face of the rotation shaft;
wherein the sleeve is retreated from an end part of the permanent magnet on one side in an axial direction to an other side in the axial direction so that a first ring-shaped recessed part is formed between the rotation shaft and the permanent magnet;
wherein the rotation shaft and the permanent magnet are fixed to each other with a first adhesive in the first ring-shaped recessed part; and
wherein a dimension in the axial direction of the sleeve is shorter than a dimension in the axial direction of the permanent magnet, so that a second ring-shaped recessed part is formed between the rotation shaft and the permanent magnet; and a bearing member which rotatably supports the rotation shaft, a part of the bearing member being inserted into the second ring-shaped recessed part;

wherein the first ring-shaped recessed part is formed so that a part of an inner peripheral face of a center hole of the permanent magnet is exposed, and the first adhesive adhesively fixes the outer peripheral face of the rotation shaft, an end face on the one side in the axial direction of the sleeve, and an exposed inner peripheral face of the center hole of the permanent magnet to each other;

wherein an outer peripheral face of the sleeve is formed with an outer peripheral side stepped part which is recessed from the end face on the one side in the axial direction of the sleeve, an outer peripheral side recessed part is formed by the outer peripheral side stepped part and the inner peripheral face of the center hole of the permanent magnet so as to be in communication with the first ring-shaped recessed part, and the first adhesive is inserted into the outer peripheral side recessed part.

11. The motor according to claim 10, wherein the first ring-shaped recessed part is located on an output side where rotation of the rotation shaft is outputted and the second ring-shaped recessed part is located on an opposite-to-output side which is an opposite side to the side where the rotation of the rotation shaft is outputted.

12. The motor according to claim 10, wherein a region of an outer peripheral face of the sleeve which is located on an outer side in a radial direction with respect to a region where an inner peripheral face of the sleeve abuts the outer peripheral face of the rotation shaft is formed with a peripheral groove which is recessed to an inner side in the radial direction from the outer peripheral face of the sleeve, and the outer peripheral face of the sleeve and the inner peripheral face of the permanent magnet are fixed to each other with a second adhesive that is applied to the peripheral groove.

13. A motor comprising:
a rotor comprising:
a rotation shaft;
a permanent magnet which is structured in a tube-like shape and fixed to an outer peripheral side of the rotation shaft; and
a sleeve which is structured in a tube-like shape, disposed between an outer peripheral face of the rotation shaft and an inner peripheral face of the permanent magnet, and press-fitted and fixed to the outer peripheral face of the rotation shaft;
wherein the sleeve is retreated from an end part of the permanent magnet on one side in an axial direction to an other side in the axial direction so that a first ring-shaped recessed part is formed between the rotation shaft and the permanent magnet;
wherein the rotation shaft and the permanent magnet are fixed to each other with a first adhesive in the first ring-shaped recessed part; and
wherein a dimension in the axial direction of the sleeve is shorter than a dimension in the axial direction of the permanent magnet, so that a second ring-shaped recessed part is formed between the rotation shaft and the permanent magnet; and
a bearing member which rotatably supports the rotation shaft, a part of the bearing member being inserted into the second ring-shaped recessed part;
wherein the first ring-shaped recessed part is formed so that a part of an inner peripheral face of a center hole of the permanent magnet is exposed, and
the first adhesive adhesively fixes the outer peripheral face of the rotation shaft, an end face on the one side in the axial direction of the sleeve, and an exposed inner peripheral face of the center hole of the permanent magnet to each other;
wherein an inner peripheral face of the sleeve is formed with an inner peripheral side stepped part which is recessed from the end face on the one side in the axial direction of the sleeve,
an inner peripheral side recessed part is formed by the inner peripheral side stepped part and the outer peripheral face of the rotation shaft so as to be in communication with the first ring-shaped recessed part, and
the first adhesive is inserted into the inner peripheral side recessed part.

* * * * *